United States Patent [19]
Anderson

[11] 3,932,744
[45] Jan. 13, 1976

[54] NULL BALANCE RADIOMETRIC APPARATUS

[75] Inventor: Alan S. Anderson, Littleton, Mass.

[73] Assignee: Williamson Corporation, Concord, Mass.

[22] Filed: Dec. 6, 1974

[21] Appl. No.: 530,079

[52] U.S. Cl. ............... 250/203; 250/205; 250/578; 356/152; 307/311
[51] Int. Cl.² .......................................... G01J 1/20
[58] Field of Search........ 250/203 R, 205, 551, 233, 250/206, 214 R, 578; 356/4, 152; 307/311

[56] References Cited
UNITED STATES PATENTS

| | | | |
|---|---|---|---|
| 3,354,773 | 11/1967 | Shreve | 250/205 X |
| 3,638,025 | 1/1972 | Dishington et al. | 250/203 R |
| 3,711,210 | 1/1973 | Krukowski | 250/205 X |
| 3,723,744 | 3/1973 | Lim et al. | 356/152 X |
| 3,772,514 | 11/1973 | Sunderland | 250/551 |

*Primary Examiner*—Walter Stolwein
*Attorney, Agent, or Firm*—Kenway & Jenney

[57] ABSTRACT

In the radiometric apparatus disclosed herein, radiant energy from a target is chopped before reaching a detector element. The same detector element receives radiation from a light-emitting diode which is periodically energized in synchronism with the chopping, the level of the energization of the light-emitting diode being varied as a function of a feedback signal obtained by synchronously demodulating the detector signal. In this manner, the a.c. component of the detector signal is driven to a null balance, the level of energization of the light-emitting diode at balance being indicative of the level of radiation received from the target.

10 Claims, 2 Drawing Figures

NULL BALANCE RADIOMETRIC APPARATUS

BACKGROUND OF THE INVENTION

This invention relates to radiometric apparatus and more particularly to such apparatus which employs a periodically energized, light-emitting diode to obtain a null balance relative to chopped radiation received from a target.

Various types of radiometric apparatus are known in the art for the non-contact measurement of temperatures. The object whose temperature is being measured is generally referred to as the target. One of the most accurate types of radiometric apparatus is that which operates in a null balance mode. In this mode of operation, the target radiation is compared with the radiation obtained from a reference source, typically, an incandescent lamp. The radiation components from the target and the reference source are chopped out-of-phase before being applied to a common detector and the output signal from the detector controls a servo loop which energizes the reference lamp in a sense tending to minimize the difference between the two energy levels. The level of energization of the reference source is then indicative of the target temperature. While this type of system attains a relatively high degree of accuracy, since the characteristics of the reference lamp are typically much more predictable and accurately known than those of commonly used detector elements, the reference lamps do gradually decay in emissivity and ultimately burn out.

Among the several objects of the present invention may be noted the provision of radiometric apparatus which will determine the temperature of target objects with high accuracy and stability; the provision of such apparatus which will operate for long periods without recalibration; the provision of such apparatus which is highly reliable and which is of relatively simple and inexpensive construction. Other objects and features will be in part apparent and in part pointed out hereinafter.

SUMMARY OF THE INVENTION

Briefly, radiometric apparatus according to the present invention employs a detector element providing a signal which varies as a function of incident radiant energy. An optical system couples radiation from a target to the detector element and means are provided for chopping this radiation and also generating a timing signal which is synchronously related to the chopping. A light-emitting diode, which operates as a reference source, is oriented to selectively provide further radiation incident on the detector.

A synchronous detector, controlled by the timing signal, demodulates a.c. components of the signal obtained from the detector so as to obtain a feedback signal which varies as a function of the relative levels of radiation incident on the detector element during the alternate phases of chopping. A circuit, controlled by the timing signal and the feedback signal together, periodically energizes the light-emitting diode synchronously with the chopping of the target radiation, the level of energization of the diode being modulated as a function of the feedback signal thereby to balance the incident radiation levels during the alternate phases of chopping. Accordingly, the level of energization of the light-emitting diode is indicative of the level of the radiation received from the target.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
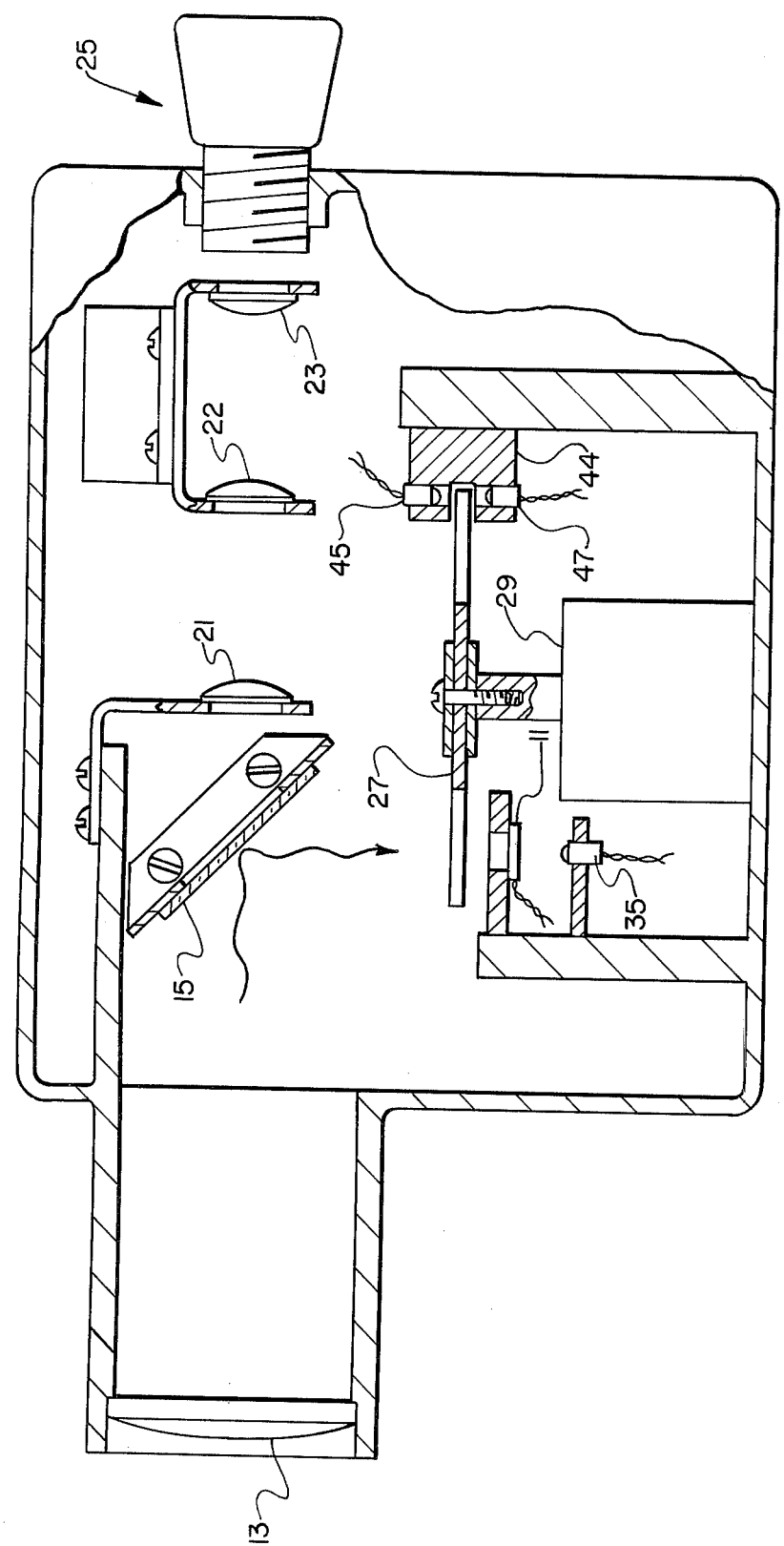
FIG. 1 is a side view, with parts broken away, showing the arrangement of optical components in radiometric apparatus constructed in accordance with the present invention.

Referring now to FIG. 1, there is indicated at 11 a detector suitable for detecting radiation at the infrared wavelengths typically employed for non-contact temperature measurement, e.g. a lead sulfide detector. As is understood, such a detector element can provide an electrical signal which varies as a function of incident radiation. Radiation from a target object is collected by a suitable objective lens 13 and directed down onto the detector 11 by a dichroic mirror 15. The characteristics of the dichroic mirror 15 are chosen so that infrared radiation is reflected down onto the detector while substantial visible radiation passes through the mirror. To facilitate aiming of the radiometric apparatus, this visible radiation is coupled, by means of inverting and relay lenses 21–23, to an eyepiece 25.

Radiation from the target can be chopped, between the mirror 15 and the detector 11, by means of a disk-like chopping member 27 which is rotated by means of a motor 29. The periphery of chopping member 27 includes a plurality of blades separated by open sectors so that radiation from the target is alternately blocked and allowed to pass to the detector as the chopping member rotates. In the embodiment illustrated, an even number of blades, e.g. four, is assumed.

A light-emitting diode 35 is mounted beneath the detector so as to selectively provide radiation thereto from the opposite side. While the detector element employed in the embodiment illustrated is sensitive from both sides so that the arrangement shown is convenient, it should be understood that other types of detectors might also be used and the light-emitting diode 35 could illuminate the detector from the same side as the target, i.e. positioned so that the reference radiation is not blocked. Filters may be positioned over the sensitive faces of the detector element 11, e.g. by cementing, so as to confine the incident radiation to the wavelengths of interest and to discriminate against scattered ambient radiation.

At a point opposite from the infrared detector 11 with respect to the periphery of the disk-shaped chopping member 27, there is mounted a so-called interrupter module 44 comprising a light-emitting diode 45 and a photodetector transistor 47. This pair of elements operates in conventional manner to provide a timing or phase reference signal. This timing signal is used in demodulating the infrared detector signal and controlling the light-emitting diode 35.

Figure 2:
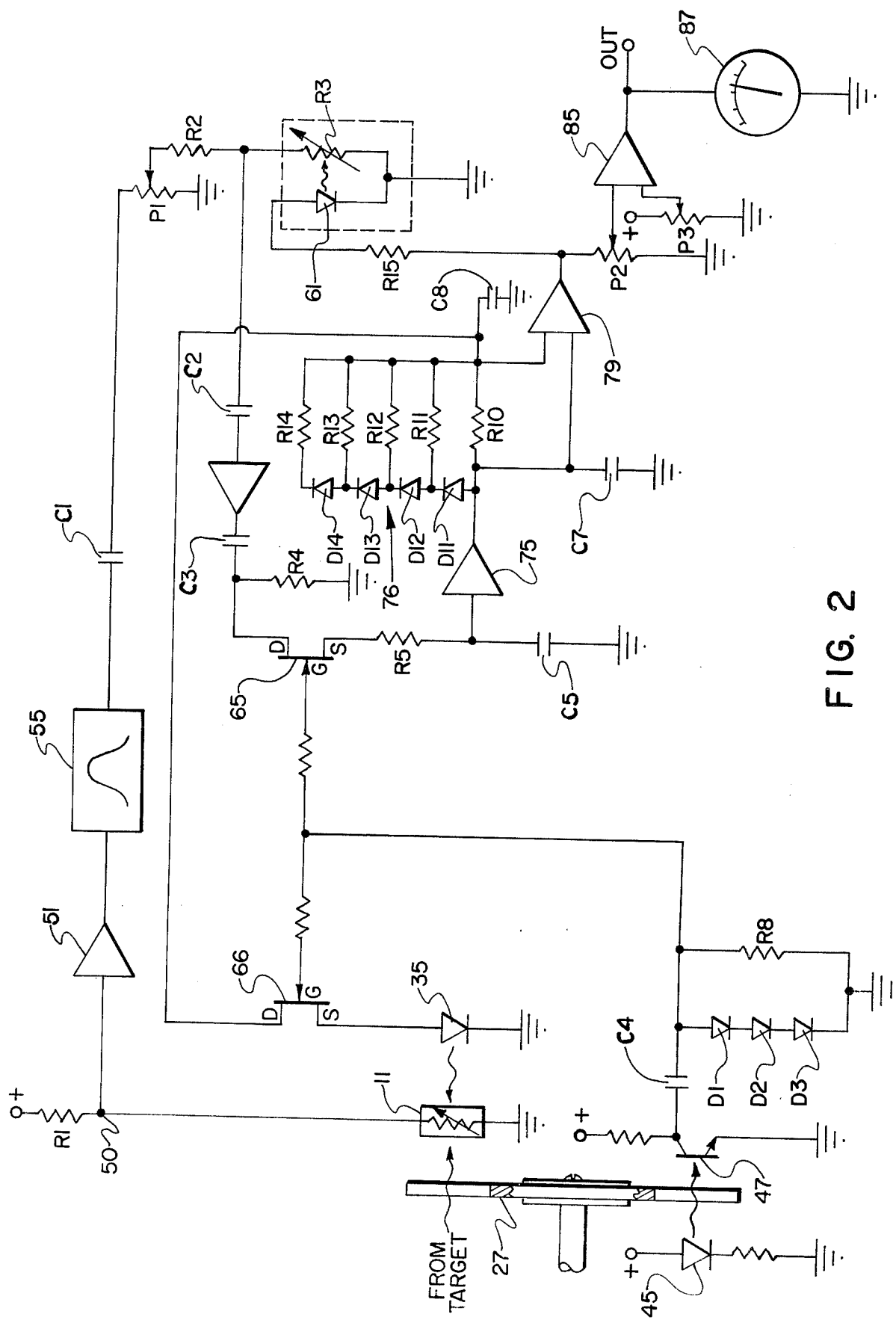
FIG. 2 is a schematic block diagram illustrating apparatus of this invention, including the arrangement of electronic circuit elements employed in conjunction with the components shown in FIG. 1.

With reference to FIG. 2, the signal obtained from phototransistor 47 is a.c. coupled through a capacitor C4 to a circuit comprising three silicon diodes D1-D3 which are connected in series and are shunted by a resistor R8. This circuit clips the signal and provides a nominal d.c. level such that the resultant signal is appropriate for operating or controlling a pair of junction field-effect transistors indicated at 65 and 66, as signal switches or gates. Suitable isolation resistors are provided as shown. The transistor 65 functions as a synchronous detector, as described in greater detail hereinafter, while the transistor 66 operates to gate the current provided to the light-emitting diode 35 so as to effect periodic energization of the diode in synchronism with the chopping of the radiation received from the target.

In addition to being de-energized when the detector 11 is exposed to target radiation, the level of energization of light-emitting diode 35 is further modulated in order to obtain a null-balance mode of operation. In the embodiment illustrated, this modulation is effected by varying the voltage supplied to the drain terminal of field-effect transistor 66. It should be understood, however, that pulse width modulation might also be used.

Referring further to FIG. 2, it can be seen that the detector 11 is connected in a voltage divider circuit with a resistance R1 across a suitable supply voltage so as to provide, at junction 50, a signal which varies as a function of the level of radiation incident on detector 11. Unless the effective radiation levels incident during the alternate phases of chopping are equal, taking into consideration the spectral sensitivity characteristics of detector 11, it can be seen that the signal provided at junction 50 will have a substantial a.c. component at the chopping frequency.

The detector signal is applied, through a voltage follower d.c. amplifier 51 to an amplifier 55 having a controlled bandpass. This stage thus serves to minimize extraneous signals which are substantially above or below the chopping frequency. Signals in a passband centered on the chopping frequency are a.c. coupled, through a capacitor C1, to a potentiometer P1 which feeds a voltage divider circuit comprising a fixed resistor R2 in series with a cadmium sulfide photocell R3. Photocell R3 is employed as a controllably variable resistance and for this purpose is illuminated by a light-emitting diode 61. The attenuation provided by the voltage divider is thus controllable as a function of the energization of the diode 61. As explained hereinafter, this controllable attenuation functions to provide an a.g.c. (automatic gain control) function.

The signal obtained from the voltage divider is a.c. coupled, through a capacitor C2, to an amplifier 63. The a.c. signal obtained from amplifier 63 is then applied, through a capacitor C3, to the drain terminal of field-effect transistor 65. Transistor 65 is operated as a half-wave synchronous detector, the input signal which is to be demodulated being referenced to ground by a resistor R4.

The output signal from the synchronous detector, i.e., the signal obtained at the source terminal of transistor 65, is applied to a filter or integrator comprising a resistor R5 and a capacitor C5. The voltage on capacitor is thus a d.c. measure or analog of the amplitude of the a.c. component of the signal obtained from detector 11. This d.c. signal is employed as a feedback signal and, after buffering through an amplifier 75, is applied through a resistor R10 and the gating transistor 66 to light-emitting diode 35. Filtering is provided on either side of resistor R10 by capacitors C7 and C8.

As will be apparent to those skilled in the art, the variation in the level of energization of the light-emitting diode 35, responsive to the feedback signal, completes a servo loop controlling the current applied to the light-emitting diode 35. The operation of this servo loop is to adjust the energization of the diode source 35 in a sense tending to minimize the a.c. component in the infrared detector signal, that is, the incident radiation provided by the source 35 is adjusted to a level equal to the incident radiation obtained from the target. An indication of this level of radiation is provided by measuring the current applied to the light-emitting diode 35.

The current applied to the diode 35 is measured by generating a voltage which is a controlled or preselected function of the current applied to diode 35. For providing this preselected transfer function, the resistor R10 is shunted by a linearizing circuit 76. Linearizing circuit 76 comprises a string of silicon diodes D11-D13 driving a succession of shunt resistances R11-R14 of graded values. The essentially fixed forward voltage drop across each diode allows the successive shunt resistances to, in effect, be picked up successively. Thus, by appropriately grading the shunt resistances, a piecewise curve fitting or linearization may be produced. As is understood, the effective level of radiation produced by the light-emitting diode 35 is not a linear function of the equivalent target temperature but, by means of this curve fitting circuit, a close approximation of output voltage with equivalent target temperature can be obtained.

The voltage developed across the linearizing circuit 76 is applied to the input terminals of a differential amplifier 79. In addition to driving the readout circuitry, the output signal from the amplifier 79 also energizes, through a resistor R15, the light-emitting diode 61 so as to complete the a.g.c. loop. The signal from amplifier 79 is applied to a potentiometer P2 which permits a sensitivity or so-called "span" adjustment of the ultimate output indication, the voltage from the potentiometer P2 being applied to a differential amplifier 85 which drives a meter 87. A d.c. reference voltage is applied, by means of a potentiometer P3, to the inverting input of amplifier 85 so that an effective zero or offset adjustment of the output indication may be provided. As the sensitivity and zero reference point of meter 87 can be adjusted independently, i.e., by means of the potentiometers P2 and P3, it can thus be seen that the meter 87 can be calibrated to display any range or portion of a range of temperatures within the overall capabilities of the instrument.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. Radiometric apparatus comprising:
   a detector element providing a signal which varies as a function of incident radiant energy;
   an optical system for coupling radiation between a target and said detector element;
   means for chopping radiation energy between said target and said detector element;
   means for generating a timing signal which is synchronously related to the chopping of radiation from said target;

a light-emitting diode for selectively providing radiation which is also incident on said detector;

synchronous detector means controlled by said timing signal for demodulating any a.c. component of the signal provided by said detector element which is synchronous with said chopping thereby to obtain a feedback signal which varies as a function of the relative levels of radiation incident on said detector element during the alternate phases of chopping; and circuit means, controlled by said timing signal and said feedback signal, for periodically energizing said light-emitting diode synchronously with the chopping at an average level of energization which is modulated as a function of the feedback signal thereby to balance the incident radiation levels during the alternate phases of chopping, the level of energization of said light-emitting diode being indicative of the level of radiation received from said target.

2. Radiometric apparatus as set forth in claim 1 wherein said chopping means comprises a rotating chopping disk and said timing signal generating means comprises an optical interrupter assembly having an optical path which is also chopped by said disk.

3. Radiometric apparatus as set forth in claim 1 wherein said synchronous detector means comprises a field-effect transistor operating as a signal gate, under the control of said timing signal.

4. Radiometric apparatus as set forth in claim 3 wherein said circuit means comprises a field-effect transistor operating as a gate and intermittently energizing said light-emitting diode under the control of said timing signal.

5. Radiometric apparatus as set forth in claim 1 including means for amplifying the a.c. component of the signal provided by said detector and a.g.c. means for reducing the gain at relatively high levels of incident radiation.

6. Radiometric apparatus as set forth in claim 1 including a linearizing circuit for generating, from the current applied to said light-emitting diode, a voltage which varies essentially in proportion to changes in the corresponding target temperature.

7. Radiometric apparatus comprising:

a detector element providing a signal which varies as a function of incident radiant energy;

an optical system for coupling radiation between a target and said detector element;

a rotatable chopping disk interposed in the optical path between said target and said detector element;

means for generating a timing signal which is synchronously related to the rotation of said chopping disk;

a light-emitting diode for selectively providing radiation which is also incident on said detector following an optical path which does not traverse said chopping disk;

synchronous detector means controlled by said timing signal for demodulating any a.c. component of the signal provided by said detector element which is synchronous with said chopping thereby to obtain a feedback signal which varies as a function of the relative levels of radiation incident on said detector element during the alternate phases of chopping; and means for applying said feedback signal to said light-emitting diode through a gating means which is controlled by said timing signal thereby to balance the incident radiation levels during the alternate phases of chopping, the average level of energization of said light-emitting diode being indicative of the level of radiation received from said target.

8. Radiometric apparatus as set forth in claim 7 wherein said synchronous detector means and said gating means comprise field-effect transistors operated as signal switches, the switch of said transistors being by said timing signal.

9. Radiometric apparatus as set forth in claim 8 including a linearizing circuit for generating, from the current applied to said light-emitting diode, a voltage which varies essentially in proportion to changes in the corresponding target temperature.

10. Radiometric apparatus as set forth in claim 9 including means for amplifying the a.c. component of the signal provided by said detector and a.g.c. means for reducing the gain at relatively high levels of incident radiation.

* * * * *